United States Patent [19]
Hobson

[11] Patent Number: 5,494,581
[45] Date of Patent: Feb. 27, 1996

[54] TREATMENT OF WATER, SEWAGE AND LIKE WASTE LIQUIDS

[75] Inventor: John A. Hobson, Devizes, Great Britain

[73] Assignee: WRc p.l.c., England

[21] Appl. No.: 180,994

[22] Filed: Jan. 14, 1994

[30] Foreign Application Priority Data

Jan. 18, 1993 [GB] United Kingdom .................. 9300886
Oct. 13, 1993 [GB] United Kingdom .................. 9321129

[51] Int. Cl.⁶ ..................................................... C02F 3/02
[52] U.S. Cl. ........................................... 210/615; 210/150
[58] Field of Search ................................... 210/615–618, 210/150, 151, 620

[56] References Cited

U.S. PATENT DOCUMENTS

| | | | |
|---|---|---|---|
| 4,100,063 | 7/1978 | Hartmann | 210/615 |
| 4,966,096 | 10/1990 | Adey | 210/615 |
| 5,262,051 | 11/1993 | Iwatsuka | 210/615 |

FOREIGN PATENT DOCUMENTS

| | | |
|---|---|---|
| 795834 | 3/1936 | France . |
| 2221382 | 11/1973 | Germany . |
| 3150912 | 6/1983 | Germany . |
| 3434144 | 3/1986 | Germany . |
| 1750530 | 7/1992 | U.S.S.R. . |

OTHER PUBLICATIONS

European Patent Office Standard Search Report (File: RS 92341).

*Primary Examiner*—Thomas Wyse
*Attorney, Agent, or Firm*—Harold Gell

[57] ABSTRACT

A process for the treatment of water or other liquid has a plurality of stationary surfaces on which microorganisms or like biologically active materials are fixed or grown which are contacted alternately with air and the liquid undergoing treatment by raising and lowering the liquid. This leads to purification by biological oxidation and other processes. Apparatus for performing the process comprises a tank containing arrays of plates and a wave generator for generating a wave action of liquid in the tank by means of which the alternate raising and lowering of the liquid is achieved. Beneficially the wavelength of the wave motion is arranged such that the tank length is ½, 1 or n times the wavelength where 2×n is an integer.

5 Claims, 2 Drawing Sheets

TREATMENT OF WATER, SEWAGE AND LIKE WASTE LIQUIDS

FIELD OF THE INVENTION

This invention relates to the treatment of water, sewage and like waste liquids.

BACKGROUND OF THE INVENTION

With increasing population and urbanisation together with improved standards of living, the treatment of water as well as of sewage and like waste waters is of cardinal importance and indeed of great public concern, not only in the preservation and improvement of the environment, but also in the conservation and recycling of water of sufficient purity for industrial and domestic uses, particularly for drinking and food preparation.

The treatment of sewage comprises the stages of settlement to remove settleable suspended matter followed by biological treatment of the supernatant liquid whereby dissolved organic material is converted into settleable biomass, and by subsequent removal of the biomass by further settlement.

In the biological stage of the treatment, the water containing dissolved organic matter is contacted with air in the presence of aerobic bacteria. The bacteria are thus cultured and grow to form with the dissolved organic matter a biomass together with carbon dioxide and water.

Contact may take place in aerated tanks (activated sludge process). Alternatively, biofilms containing the aerobic bacteria supported on and adhering to solid media may be employed, over which the supernatant liquid is sprayed or otherwise distributed. Such solid material may be in the form of a percolating filter, also called a trickling or biological filter.

Filtration installations of the latter kind are extensive in area and subject to various technical disadvantages and a more sophisticated contacting arrangement is known as the rotating biological contactor (RBC) in which parallel discs with attached biofilms are rotated alternately through the supernatant liquid to be treated and the air, thus facilitating oxygen transfer into the biofilm.

SUMMARY OF THE INVENTION

The present invention seeks to provide improvements over the existing processes and installations for the treatment of water, sewage and like waste liquids.

According to one aspect of the invention, there is provided a process for the treatment of water or other liquid in which stationary surfaces having microorganisms or like biologically active material fixed to or growing thereon are contacted alternately with air and the liquid undergoing treatment by raising and lowering the liquid whilst said liquid is moved substantially horizontally past said surfaces.

In a preferred embodiment of the invention, the stationary surfaces take the form of an array of plates which are preferably substantially parallel to one another and which are desirably mounted in a tank which is adapted to contain the liquid to be treated.

Alternate contact of the surfaces with the liquid to be treated and air may be effected by wave action which preferably comprises a stationary, standing or non-progressive wave, arising from a resonant frequency of the tank, the length of said tank being an integral or half-integral number of wavelengths characteristic of the wave motion.

Wave motion may be induced by one of several means including, for example, an oscillating mechanical baffle or, alternatively, by alternately blowing air into and sucking air out of a chamber enclosing a portion of the liquid surface to induce an oscillation of the liquid surface and hence wave motion in the rest of the tank.

Another aspect of the present invention provides apparatus for performing the above-described process, said apparatus comprising a tank adapted to contain water or other liquid to be treated and an array of plates arranged in said tank, said plates providing the said stationary surfaces.

Preferably, the surface of the plates is roughened to encourage the attachment of biological growth.

According to a preferred embodiment of the invention, a wave generator is located in the tank and is arranged to generate a wave action in order to achieve said raising and lowering of liquid in the tank. The wave generator may be located at or adjacent to one end of the tank or substantially at the centre of the tank. In the latter case, it is preferable if two arrays of plates are provided, each array being located between the wave generator and a respective end of the tank.

The tank is desirably arranged to have a length which is an integral or half-integral number of wavelengths characteristic of the wave motion generated by the wave generator, in other words, the tank length should advantageously be ½, 1 or n times the wavelength where 2×n is an integer. The wave generator itself is desirably of variable frequency so that the wave motion can be "tuned" to the dimensions of the tank and the average depth of the liquid contents.

BRIEF DESCRIPTION OF THE DRAWINGS

The invention will now be further described, by way of example, with reference to the drawings, in which.

DESCRIPTION OF PREFERRED EMBODIMENTS

Figure 1:
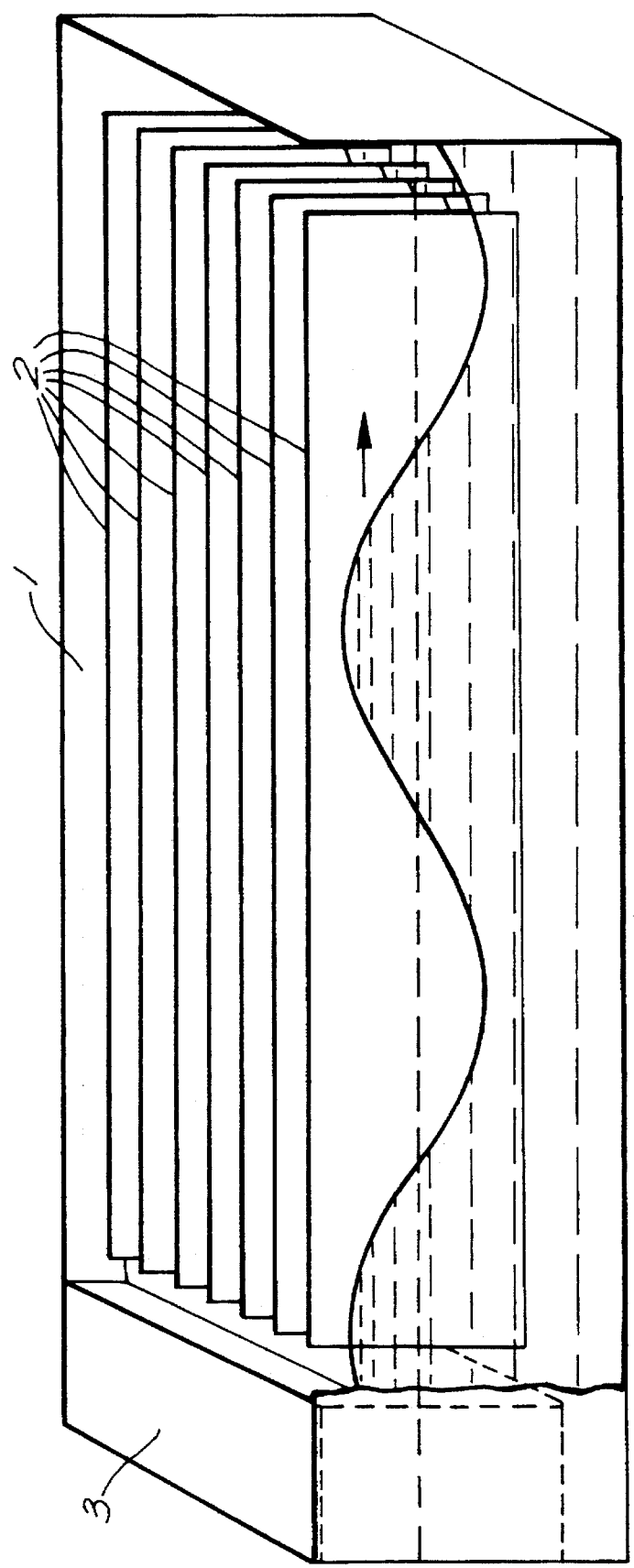
FIG. 1 is a schematic perspective view of one embodiment of an apparatus according to the invention for the treatment of water or other liquid.

Reference will first be made to FIG. 1 of the drawings in which the apparatus comprises a parallel-sided tank 1 containing a plurality of parallel, vertical, elongated plates 2 having attached biofilms, along which pass waves propagated by a wave-generator 3 located at or adjacent to one end of the tank.

Figure 2:
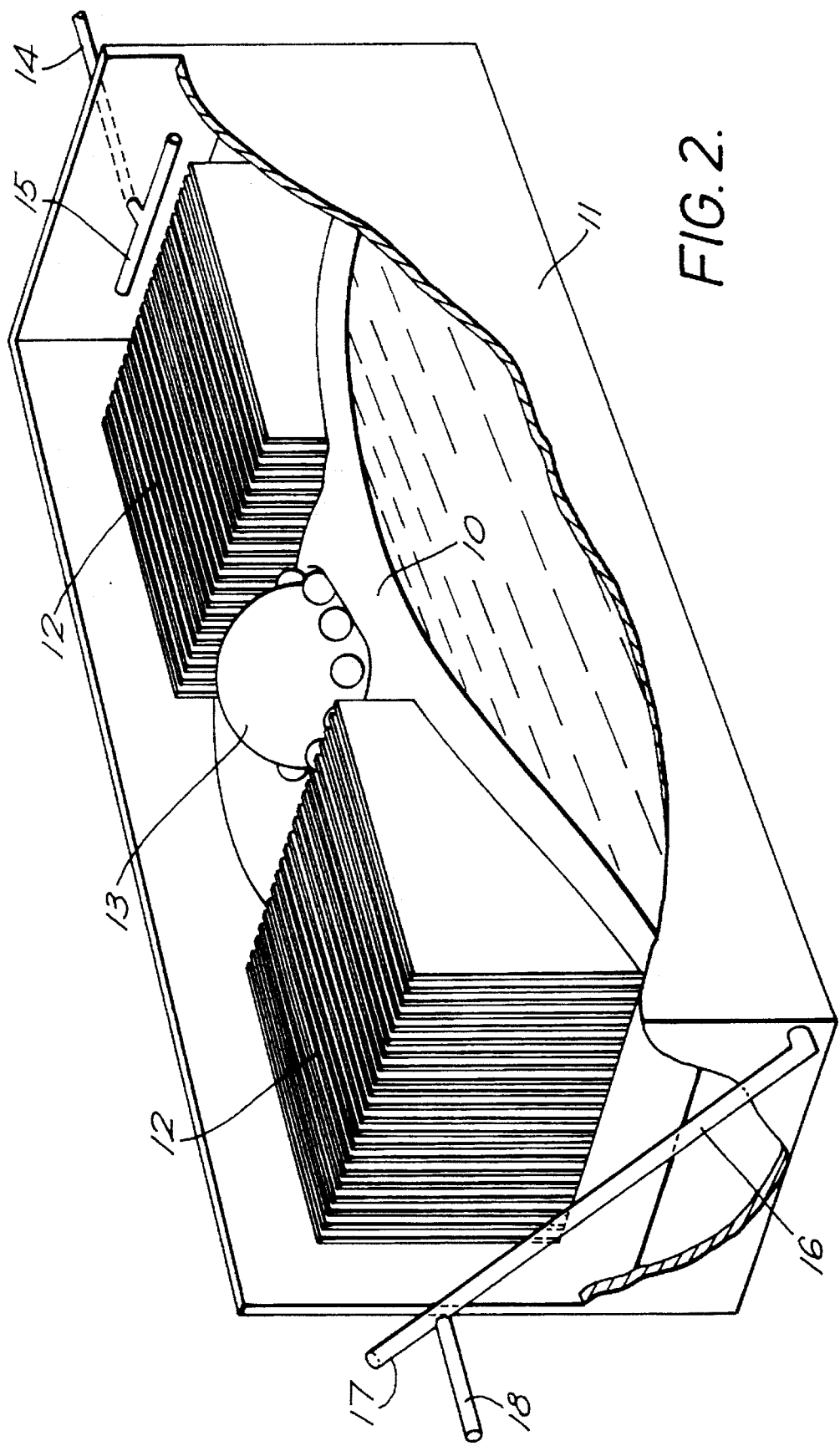
FIG. 2 is a schematic perspective view of a second embodiment of an apparatus according to the invention for the treatment of water or other liquid.

The apparatus shown in FIG. 2 of the drawings comprises a similar parallel-sided tank 11 but this time the tank contains two vertical, longitudinal arrays of plates 12.

The plates are desirably made of a plastics material having a roughened surface to encourage the attachment of biological growth. Located substantially at the centre of the tank is a variable frequency wave generator 13 for generating a resonating wave motion.

The wave generator takes the form of a sphere which is arranged to rise and fall in the tank in reaction to an internal oscillating weight which is arranged to be driven by a variable frequency motor (not shown).

The tank 11 is provided at one end with a feed pipe 14 leading to an inlet 15 for waste water or other liquid to be passed into the tank. At the other end of the tank a rigid pipe 16 is rotatably mounted, said pipe having a syphon breaker 17 at its upper end and being connected to a flexible pipe 18 by means of which treated water or other liquid may be removed from the tank 11. The pipe 16 is rotatable in order to allow the depth of water or other liquid in the tank to be adjustable. This is beneficial because it is difficult to predict precisely the level of water or other liquid in the tank for any particular mode of wave motion and setting of the outlet.

Once water or other liquid to be treated has been passed into the tank 11 through the feed pipe 14 and inlet 15, the wave generator 13 is activated to generate a wave motion in the liquid for example waste water 10 as shown in the drawing. As the liquid rises and falls, typically once every 1 to 5 seconds, the active biofilms on the plastic plates alternately contact air and the waste water, and in metabolising both oxidise waste components in the water to carbon dioxide and water or convert them into biosolids. Considerable biofilms also develop on the totally submerged area of the plates and these also contribute to treatment. The resonating wave motion as well as bringing about the alternating contact suitable for treatment, also acts as an aerator. Dissolved oxygen diffuses into the bulk of the water in the tank and thence into the submerged biomass promoting further treatment.

A beneficial aspect of the system is the development of two distinct forms of biofilm, one in the oxygen rich zone of alternating contact and the other in the more oxygen limited zone of complete immersion, each of which can contribute to treatment in differing ways. It is possible to set up the system, when treating sewage, so as to achieve nitrification of ammonia in the oxygen rich zone and denitrification in the oxygen limited zone. This will be very valuable in areas where the receiving waters require a limit on total nitrogen or to protect groundwater should the final effluent be destined for disposal via sub-surface irrigation.

As in all systems for the biological treatment of water, a portion of the polluting material is converted into biosolids. These must leave the system, along with the treated water and can be removed by settlement or filtration for separate disposal or recycling.

The wave generator need not necessarily be located at the centre of the tank as in FIG. 2 but could be located at one end of the tank as in FIG. 1 or in any other suitable position. The preferred position depends on the type of wave motion and the present invention is directed to the concept of inducing the treatment of water or other liquid by wave motion and is not specific to any particular type of wave generator.

Another beneficial aspect of the present invention is the ability to switch between different resonant frequencies of wave motion. This can be beneficial for example to increase temporarily the scouring action of the wave motion to prevent excessively thick biofilms from building up and hindering the wave motion. In addition such switching can increase the effective area of the plastic plates. In a single wave-mode, the wave envelope defines the zone of alternating contact. Unless the plates were cut to follow the shape of this envelope, which would limit operation to this single wave-mode, a portion of the plates will remain dry and unused. Switching between two or more wave modes can cause this otherwise lost area of plate to be utilised for treatment.

The plates 2 or 12 should preferably be arranged substantially parallel to one another and to the longitudinal sides of the tank so as not to impede the wave motion other than by friction unavoidably generated as the water or other liquid flows past the surfaces of the plates.

While primarily intended for the treatment of sewage and waste water, the invention is not restricted to this and can be used for the treatment of other liquids. Further, the invention is not restricted to the embodiments illustrated in the drawings but variations and modifications may be made without departing from the scope of the invention.

I claim:

1. A process for the treatment of liquid in a tank in which stationary surfaces having biologically active material fixed to or growing thereon are contacted alternately with air and the liquid undergoing treatment by raising and lowering said liquid by artificially induced wave action.

2. A process as claimed in claim 1, in which the stationary surfaces take the form of an array of plates which are substantially parallel to one another.

3. A process as claimed in claim 2, in which the plates are arranged in a tank adapted to contain the liquid to be treated.

4. A process as claimed in claim 1, in which the wave action comprises a stationary, standing or non-progressive wave, arising from a resonant frequency of the tank, the length of said tank being an integral or half-integral number of wavelengths characteristic of the wave motion.

5. A process for the treatment of water in a tank in which stationary surfaces having micro-organisms growing thereon are contacted alternately with air and water undergoing treatment by raising and lowering the water by artificially induced wave action which causes the water to move substantially horizontally past said stationary surfaces.

* * * * *